Aug. 26, 1930.  J. P. DAGENHART  1,774,132
DRAFT BAR FOR COTTON PICKING MACHINES
Filed Aug. 29, 1929
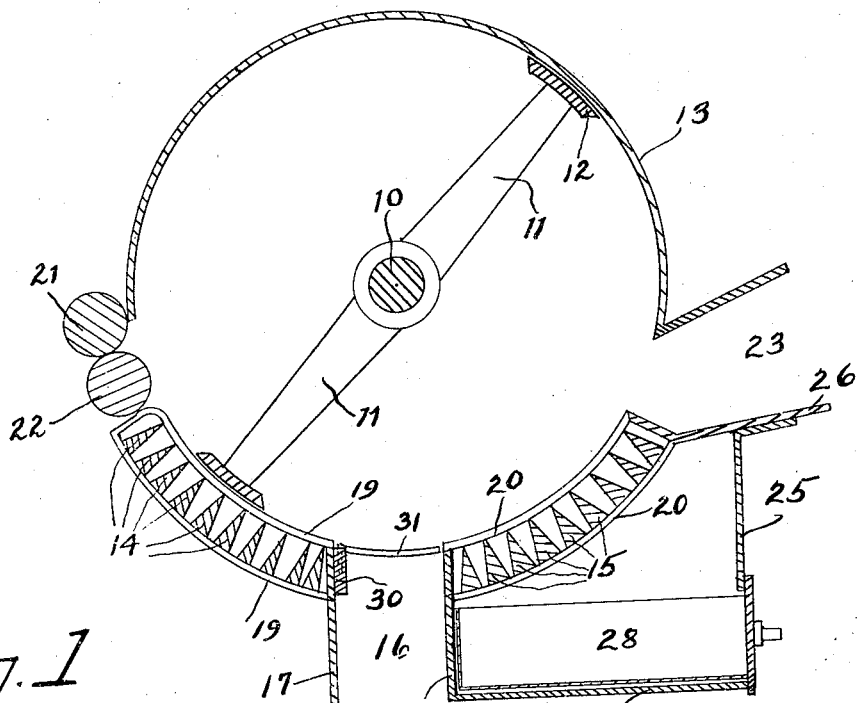
Fig. 1
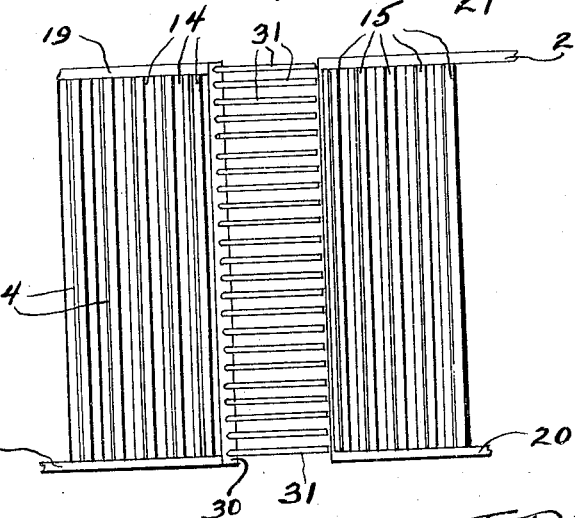
Fig. 2
Fig. 3
Inventor
J. P. Dagenhart
By  *Paul B Eaton*
Attorney Patented Aug. 26, 1930

1,774,132

UNITED STATES PATENT OFFICE

JONES P. DAGENHART, OF GASTONIA, NORTH CAROLINA

DRAFT BAR FOR COTTON-PICKING MACHINES

Application filed August 29, 1929. Serial No. 389,198.

My invention relates to an improvement in cotton picking machines, and more especially to an improvement in the beater section of the machine, where the cotton is opened and combed, so as to clean the cotton as it is passed through the cotton picking machine to be formed into a lap.

An object of my invention is to provide an improvement in a cotton picking machine whereby cotton is more thoroughly cleaned, and by means of my improvement a greater draught is allowed to be brought into the picking section of the machine.

Another object of my invention is to provide a plurality of longitudinally disposed bars spaced apart from each other, and adapted to be placed in an opening in the bottom of the picking section of the machine, so that the cotton will be passed over these bars, and a supply of air will be allowed to be drawn into the machine to aid in the picking operation.

Some of the objects of my invention having been stated, other objects will appear as the description proceeds, when taken in connection with the accompanying drawings, in which—

Figure 1 is a cross-section through the beater portion of a cotton picking machine;

Figure 2 is a plan view of the lower section of Figure 1;

Figure 3 is an enlarged detailed, side elevation of the bar, and the means for holding the bar in position.

Referring more specifically to the drawings the numeral 10 indicates the shaft on which the beater arms 11 are mounted, and on the ends of these beater arms are the blades 12 which operate within the casing 13, and on the lower side of this casing are mounted the grid bars 14, and another set of grid bars is indicated by the reference character 15, with an opening 16 therebetween, and it is in this opening that I propose to place my invention. The opening 16 has the perpendicular members 17 and 18 on opposite sides thereof, which merge with the frameworks 19 and 20 of the beater casing, and in this framework 19 and 20 the sets of grid bars 14 and 15 are mounted. This beater casing has the two rolls 21 and 22 on one side thereof through which the cotton is introduced into the machine, and it has the exit portion 23 from which the cotton emerges from the beater section of the machine.

Below the sets of grid bars I provide the downwardly projecting portion 25 which is secured to the portion 26 of the exit portion, and the portion 18 has the horizontally disposed portion 27, and in this casing formed by these members I mount the drawer 28, the purpose of said drawer being to receive the trash through the grid bars 15.

The structure thus far described is adapted to cooperate with my improved grid bars which I mount into the machine by securing a strip 30 to the apron portion 17 and this extends all the way across my machine as is evident in Figure 2. Equi-distantly spaced along this bar 30 are the grid bars 31 which extend in the form of an arc of a circle, so that the blades 12 will pass in close proximity thereto, and these grid bars 31 almost touch the vertical portion 18 and form a bridge for the cotton, but allows air to be drawn upwardly through the passageway 15 to allow an increased amount of air to enter into the beater casing 13 and this aids materially to clean the cotton.

In cotton pickers of the conventional type the portion occupied by the bars 31 has heretofore been closed by a sheet metal strip so as to prevent any air whatever from coming in at this point. This meant that the draft which was drawn into the picker casing came in largely through the grid bars 14, and as a result this hindered the free falling of lint and dirt through these bars 14. By providing the opening 16 and the bars 31 I allow the greatest amount of draft to pass up into the beater casing and therefore a minimum amount of draft is pulled between the grid bars 14 which allows the dirt and trash to fall more easily down through the grid bars 14.

In the drawings and specification I have set forth a preferred embodiment of my invention, and although specific terms are employed they are used in a generic and descriptive sense only, and not for purposes of limitation, the scope of the invention being set forth in the appended claims.

I claim:

1. In a cotton picking machine, a casing, a beater mounted in said casing, a plurality of grid bars mounted in said casing adapted to cooperate with the beater, said grid bars being divided into two sections with an opening therebetween, a strip secured transversely of the machine in the side walls of the said opening, and a plurality of spaced grid bars mounted at right angles to the grid bars in said strip and being adapted to admit air therethrough.

2. In a cotton picking machine having a beater casing and a beater mounted therein with a plurality of grid bars adapted to cooperate with the beater, said grid bars being divided into two sections with a passageway therebetween through which air is admitted into the beater casing, and a plurality of spaced grid bars mounted at approximately right angles to the grid bars in said opening through which air is adapted to be drawn into the beater casing.

3. In a cotton picker, a casing, a beater mounted in said casing, two sections of spaced bars adapted to cooperate with the beater, a passageway disposed transversely of the machine, and being positioned between opposite sets of bars, a plurality of spaced bars mounted at right angle to the grid bars of the machine and being spaced apart from each other whereby air is admitted into the beater casing from a point other than that of the point where the cotton is admitted.

4. In a cotton picking machine, a casing, a beater mounted in said casing, a plurality of grid bars mounted in said casing and being divided into two sections by an opening in the bottom portion thereof, and a plurality of bars mounted in said opening, said last named bars being disposed in alinement with the travel of the beater.

5. In a cotton picking machine having a beater casing and a beater mounted therein with a plurality of grid bars adapted to cooperate with the beater, an opening disposed in the bottom portion of the beater casing through which air is adapted to be drawn into the beater casing, a plurality of bars disposed across said opening to prevent cotton from falling through said opening.

6. In a cotton picking machine having a beater casing and a beater rotatably mounted therein, a section of grid bars mounted on the lower side portion of the casing, another section of grid bars mounted on the other lower side of the casing, an opening between the two sections of grid bars in which a plurality of spaced bars are mounted in alinement with the travel of the beater whereby the maximum amount of air is drawn into the casing through the longitudinally disposed bars, and a minimum amount of air is drawn through the grid bars themselves.

In testimony whereof I affix my signature.

JONES P. DAGENHART.